United States Patent
Smith, Jr.

(10) Patent No.: US 7,616,093 B2
(45) Date of Patent: *Nov. 10, 2009

(54) METHOD AND SYSTEM FOR IDENTIFYING EXPIRED RFID DATA

(75) Inventor: Donnie Allen Smith, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/772,382

(22) Filed: Jul. 2, 2007

(65) Prior Publication Data

US 2009/0009334 A1 Jan. 8, 2009

(51) Int. Cl.
*H04Q 5/22* (2006.01)
(52) U.S. Cl. ............... 340/10.1; 340/572.1; 340/10.5
(58) Field of Classification Search .......... 340/572, 340/10, 505
See application file for complete search history.

(56) References Cited

U.S. PATENT DOCUMENTS

| | | | |
|---|---|---|---|
| 5,963,134 A * | 10/1999 | Bowers et al. ......... 340/572.1 |
| 6,195,006 B1 * | 2/2001 | Bowers et al. ......... 340/572.1 |
| 6,708,879 B2 * | 3/2004 | Hunt .................... 235/385 |
| 6,774,782 B2 * | 8/2004 | Runyon et al. ........... 340/505 |
| 7,002,473 B2 * | 2/2006 | Glick et al. ........... 340/572.1 |
| 7,176,797 B2 * | 2/2007 | Zai et al. .............. 340/572.1 |
| 7,239,241 B2 * | 7/2007 | Claudatos et al. ....... 340/572.1 |
| 7,245,221 B2 * | 7/2007 | Claudatos et al. ....... 340/572.1 |
| 7,394,372 B2 * | 7/2008 | Gloekler et al. ......... 340/572.1 |
| 7,403,108 B2 * | 7/2008 | Aljadeff et al. ......... 340/500 |
| 2005/0134459 A1 * | 6/2005 | Glick et al. ........... 340/572.1 |
| 2005/0258955 A1 * | 11/2005 | Gloekler et al. ....... 340/539.13 |
| 2006/0022823 A1 * | 2/2006 | Ryal .................... 340/572.1 |
| 2006/0202803 A1 | 9/2006 | Yoon |
| 2008/0106411 A1 * | 5/2008 | Smith .................... 340/572.1 |
| 2009/0009334 A1 * | 1/2009 | Smith, Jr. .............. 340/572.4 |

* cited by examiner

Primary Examiner—Toan N Pham
Assistant Examiner—Travis R Hunnings
(74) Attorney, Agent, or Firm—Jeanine S. Ray-Yartetts

(57) ABSTRACT

For reducing the frequency with which RFID transponders are read in an RFID system, the RFID system logs a timestamp associated with each read of an RFID transponder along with the tag ID and reader identifier. The timestamp associated with each log entry is monitored with respect to an expiration value so that expired log entries may be identified. When a log entry is determined to be expired, other elements of the RFID system are notified of the associated tag ID and reader identifier, and the storage occupied by the expired log entry is freed.

13 Claims, 4 Drawing Sheets

METHOD AND SYSTEM FOR IDENTIFYING EXPIRED RFID DATA

FIELD OF THE INVENTION

This invention relates generally to radio frequency identification (RFID) systems and, more specifically, to the filtering of data passed from RFID readers to application software.

This patent is related to copending patent application Ser. No. 11/556,435 also assigned to the assignee of record in the present patent application.

BACKGROUND

RFID transponders, also known as RFID tags, may be affixed to items for the purpose of making those items identifiable and/or trackable. RFID transponders can be small, inexpensive, and unobtrusive, making it feasible to affix them by a variety of means, including incorporation into stick-on labels, or encapsulation for the purpose of implanting under skin or embedding in the interior of an item. Examples of items to which RFID transponders can be affixed include pieces of merchandise in a store, palettes of goods in shipment, vehicles on a toll road, passports, books in a library, and individual animals.

In RFID systems, an RFID reader emits a radio signal to which an RFID transponder responds. The response is detected, or read, by the RFID reader. The response includes a transponder identifier, called a tag ID, and may convey additional data about an item associated with the transponder. The reader forwards the data from the transponder to another element of the RFID system which may filter and aggregate the data. Ultimately, the data arrives at a backend system for processing. The backend system supports software applications that utilize the RFID data for whatever purpose is served by the RFID system.

A multiplicity of transponders may exist within range of the RFID reader. Each transponder may respond to the signal emitted by the RFID reader. Because transponders may enter and exit the range of the RFID reader, the RFID reader uses its emitted radio signal to periodically interrogate, or sample, the transponders within its range. The RFID reader may sequentially interrogate every transponder in its range in a given sample period (bulk reading), or it may interrogate specific transponders at a particular time. Transponders that remain in the range of the RFID reader from one sample period to another may, if bulk read, create duplicate, redundant information in the RFID system.

The RFID reader may be one of many in the RFID system. As data from a multiplicity of RFID readers, each conveying data from a multiplicity of RFID transponders in its range, is funneled upward through middleware to the backend system, the volume of data traffic may tax the capacity of the interconnections and storage resources in the RFID system. It is, thus, desirable to filter from the data traffic duplicate or redundant information.

SUMMARY

In a first embodiment, the tag ID of each RFID transponder read by an RFID system is recorded in a log. Each log entry comprises the tag ID, a reader identifier, and a timestamp used to determine an age of the log entry. The reader identifier allows the RFID system to identify the RFID reader that was the source of the data being logged and might be, for example, the serial number or location of the RFID reader. The timestamp for each log entry is monitored with respect to a predetermined expiration time. When a log entry has expired, that log entry is purged and other elements of the RFID system are notified of the tag ID and reader identifier associated with the expired log entry.

In a second embodiment, the tag ID of each RFID transponder read by an RFID system is recorded in a log that is maintained in cache memory. Each log entry comprises the tag ID, a reader identifier, and the time that the data was read. An age for each log entry is monitored to determine when a log entry has expired. The age of a log entry is computed by subtracting the time of that log entry from a current time. When the age of a log entry exceeds a pre-determined expiration age, the log entry is determined to be expired. The expired log entry is removed from the cache and other elements of the RFID system are notified of the tag ID and reader identifier associated with the expired log entry.

In a third embodiment, the tag ID of each RFID transponder read by an RFID system is recorded in an apparatus that maintains a log. Each log entry comprises the tag ID, a reader identifier, and a timestamp used to determine an age of the log entry. Logic monitors the timestamp for each log entry with respect to a predetermined expiration value. When a log entry has expired, logic frees storage occupied by the expired log entry and logic notifies other elements of the RFID system of the tag ID and reader identifier associated with the expired log entry.

Other embodiments, aspects, and advantages will become evident from the following description and the appended claims.

BRIEF DESCRIPTION OF THE DRAWINGS

The invention may be best understood by reading the following detailed description together with the drawings, wherein.

DETAILED DESCRIPTION

Figure 1:
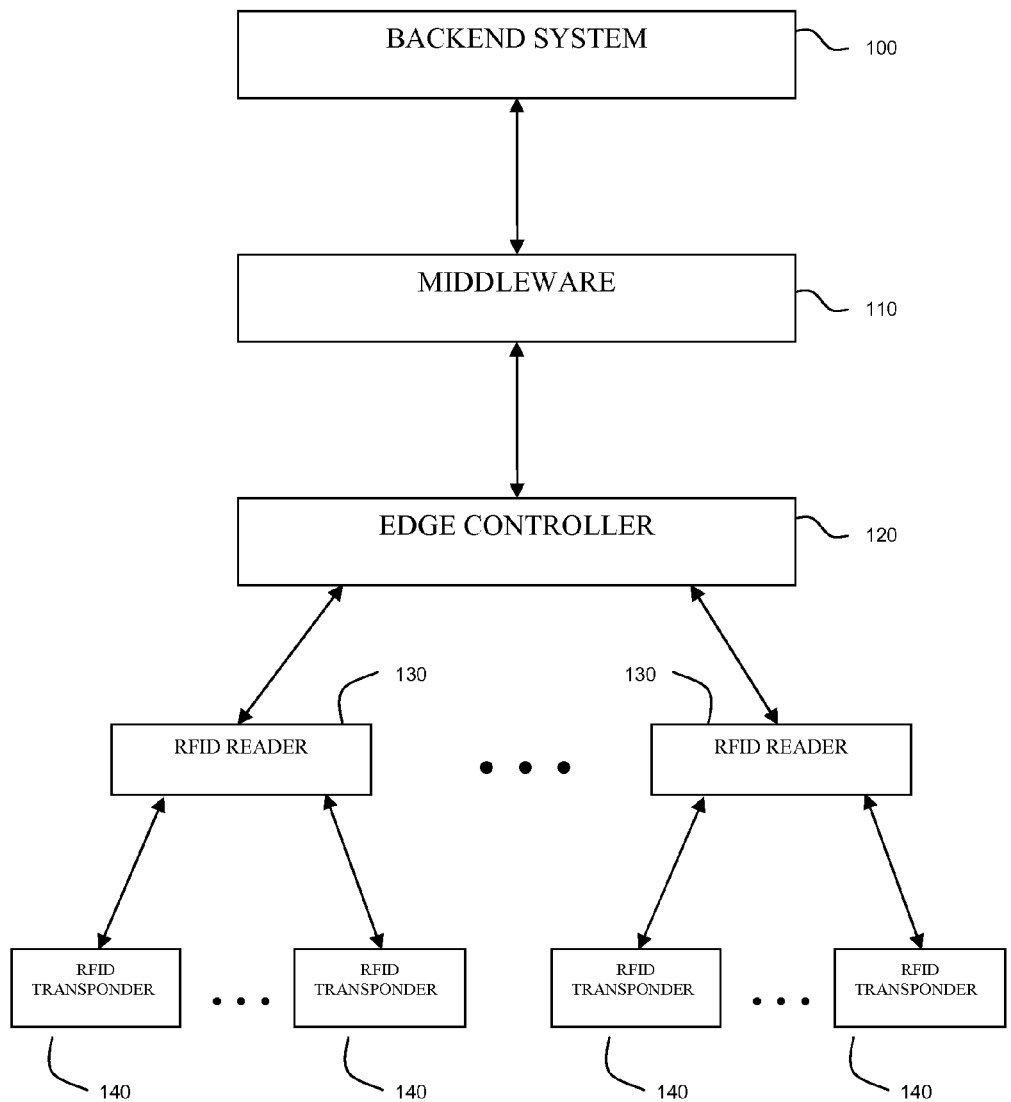
FIG. 1 is an overview of a typical RFID system.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer-usable storage medium having computer-usable program code embodied in the medium. Any suitable computer-readable medium may be utilized, including hard disks, CD-ROMs, optical storage devices, magnetic storage devices, and transmission media such as those supporting the Internet or an intranet.

Computer program code for carrying out operations of the present invention may be written in an object oriented programming language such as Java, Smalltalk, or C++. However, the computer program code for carrying out operations of the present invention may also be written in conventional procedural programming languages, such as the C programming language. The program code may execute entirely on the user's computer, partly on the user's computer, as a standalone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to flowchart illustrations and/or block diagrams of methods, apparatus (systems), and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and/or block diagram block or blocks.

Referring now to FIG. 1, an RFID reader 130 is operably connected to a multiplicity of RFID transponders 140 via wireless communication. RFID readers 130 are operably connected to edge controller 120. Commands and configuration data may be passed from edge controller 120 to RFID readers 130, and data is passed from RFID readers 130 to edge controller 120. The RFID system may comprise a multiplicity of edge controllers 120 each of which may receive data from a multiplicity of RFID readers 130. Edge controller 120 filters the data to remove duplicate redundant information and then passes the filtered data to middleware 110, which is operably connected edge controller 120. Intermixed in the data returned to middleware 110 by edge controller 120 may be notifications, inserted by edge controller 120, informing middleware 110 or applications running in backend system 100 of significant events. Middleware 110, which might typically be installed in a data center, is operably connected to backend system 100. Middleware 110 may further filter and format the data for presentation to software running in backend system 100.

Figure 2:
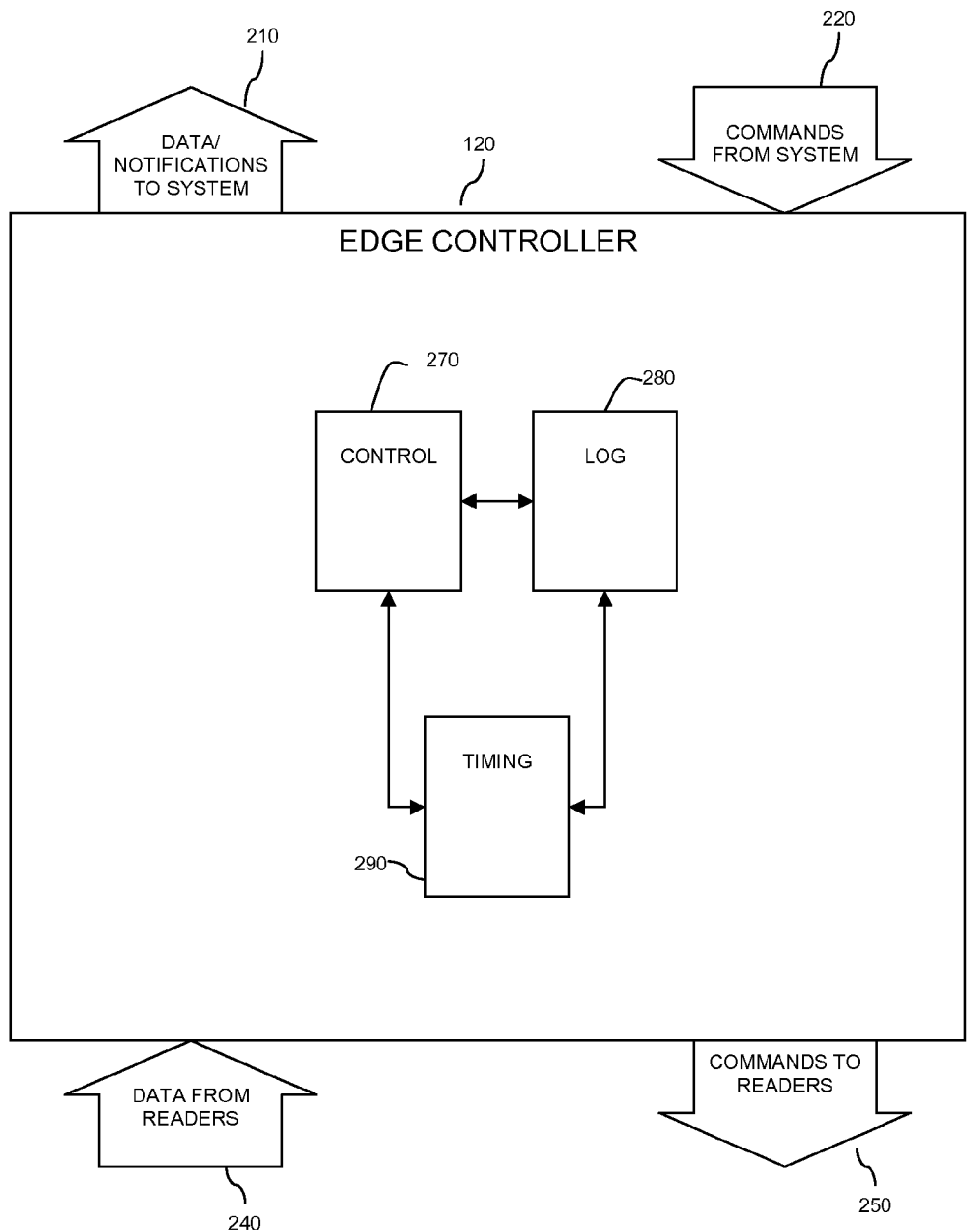
FIG. 2 shows a general overview of data flows into and out of edge controller 120.

Referring to FIG. 2, edge controller 120 receives data stream commands_from_system 220 from middleware 110. Data stream commands_from_system 220 may include configuration data for edge controller 120, such as a new expiration value, a new timer initialization value, or a new offset value. Data stream commands_from_system 220 may also include a request for new RFID data from RFID transponders 140. Requests for new RFID data are processed appropriately by edge controller 120 and passed to RFID reader 130 as read commands in data stream commands_to_readers 250. The read commands in data stream commands_to_readers 250 may instruct RFID reader 130 to interrogate a specific RFID transponder 140 or to interrogate all RFID transponders 140 in the read field of RFID reader 130. Responses from RFID reader 130 will be passed to edge controller 120 in data stream data_from_readers 240. For each responding RFID transponder 140, there will be data in data stream data_from_readers 240 comprising the tag ID of the responding RFID transponder and a reader identifier corresponding to the interrogating RFID reader 130. The reader identifier allows the RFID system to identify the RFID reader that is the source of the data and might be, for example, the serial number or location of the RFID reader. Data stream data_from_readers 240 may be filtered by edge controller 120 before being passed to middleware 110 in data stream data/notifications_to_system 210.

Control 270 extracts from data stream data_from_readers 240 data associated with each responding RFID transponder 140 and, for each responding transponder 140, control 270 creates a log entry in log 280 comprising the tag ID, reader identifier, and a timestamp. The timestamp is a value that will be used by timing 290 to determine that a log entry is expired. In one embodiment, the timestamp may be the contents of a realtime clock at the instant that the log entry is created. In a second embodiment, the timestamp may be a pre-set initialization value that is used to initialize a timer that is started when the log entry is created. The initialization value may be modified by other elements of the RFID system via appropriate commands in data stream commands_from_system 220. In a third embodiment, the timestamp may be derived from the contents of a realtime clock by adding to it a pre-set offset value. The offset value may be modified by other elements of the RFID system via appropriate commands in data stream commands_from_system 220.

Timing 290 monitors log 280 to detect expired log entries. A log entry is determined to be expired based upon the value of its timestamp. In one embodiment, the timestamp may be subtracted from the current contents of a realtime clock to provide a difference, the difference then being compared to a pre-set expiration value. The expiration value may be modified by other elements of the RFID system via appropriate commands in data stream commands_from_system 220. If the difference is greater than the pre-set expiration value, the log entry is determined to be expired. In a second embodiment, a timer is associated with each log entry. The timer may increment or decrement in time. The timer is initialized to a pre-set initialization value when the log entry is stored. Upon the timer reaching a pre-set expiration value, the associated log entry is determined to be expired. The expiration value may be modified by other elements of the RFID system via appropriate commands in data stream commands_from_system 220. In a third embodiment, the timestamp may be compared to the current contents of a realtime clock. If the current contents of the realtime clock are greater than the timestamp, then the log entry is determined to be expired.

For any log entry determined to be expired, timing 290 inserts into data stream data/notifications_to_system 210 a notification of an expired log entry. The notification includes the tag ID and reader identifier from the expired log entry and may be used by middleware 110 or the backend system 100 to request, via data stream commands_from_system 220, a subsequent read of the RFID reader 130 or the RFID transponder 140 associated with the expired log entry. Timing 290 also causes the removal from log 280 of a log entry that has been determined to be expired.

Figure 3:
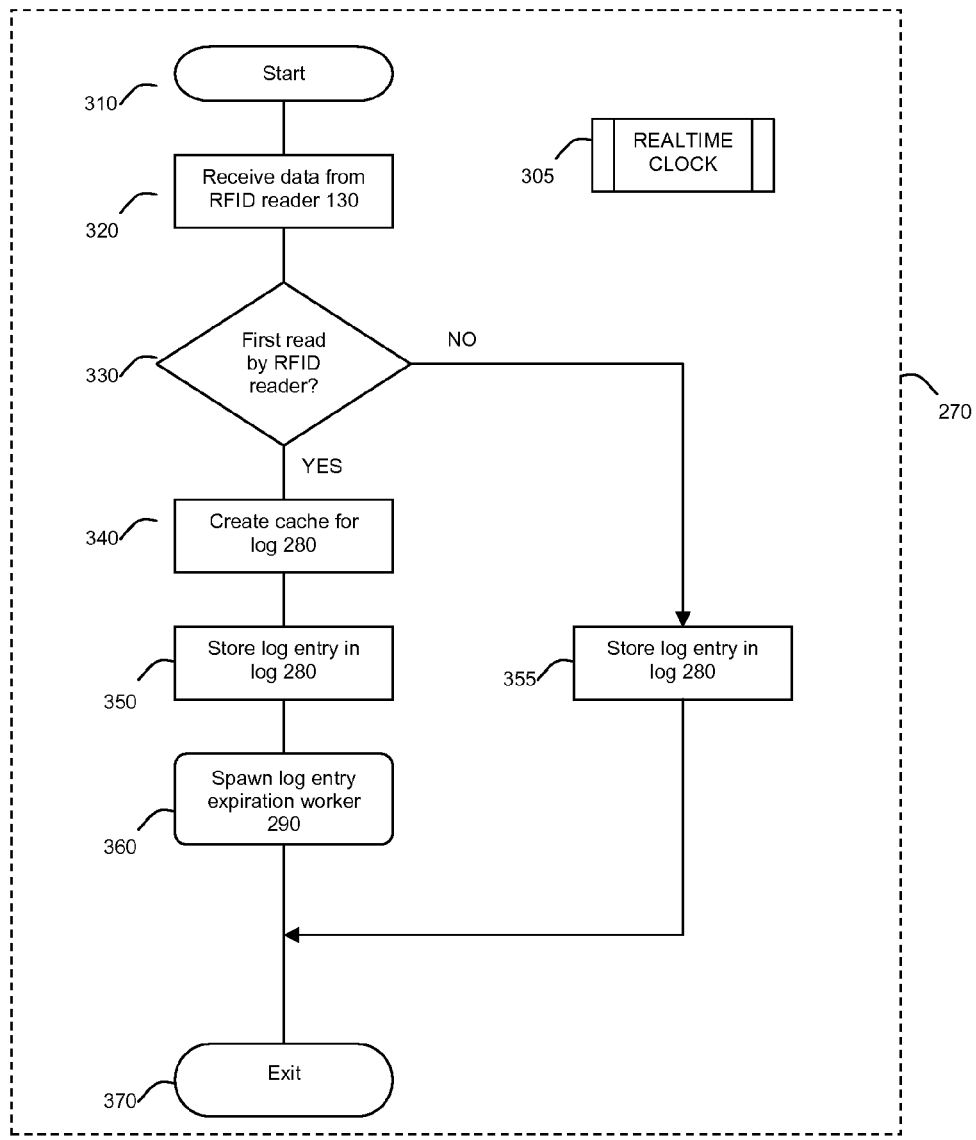
FIG. 3 illustrates a preferred embodiment of that portion of the present invention that comprises control 270.

In a preferred embodiment, control 270 is software executing in edge controller 120. FIG. 3 illustrates the flow in more detail beginning with START 310.

In block 320, for each responding RFID transponder 140, control 270 extracts tag ID and reader identifier from data stream data_from_readers 240 that is passed by RFID reader 130 to edge controller 120.

In block 330, control 270 tests to determine if the extracted tag ID and reader identifier corresponds to the first data returned by that RFID reader. If so, operation proceeds to block 340. Otherwise, operation proceeds to block 355.

In block 340, control 270 creates a cache to serve as log 280.

In block 350, control 270 adds to log 280 a log entry comprising the tag ID, reader identifier, and the contents of realtime clock 305.

In block 360, control 270 initiates a timing task 290 to detect expired log entries in log 280.

In block 355, control 270 adds to log 280 a log entry comprising the tag ID, reader identifier, and the contents of realtime clock 305.

Operation ends in block 370.

Figure 4:
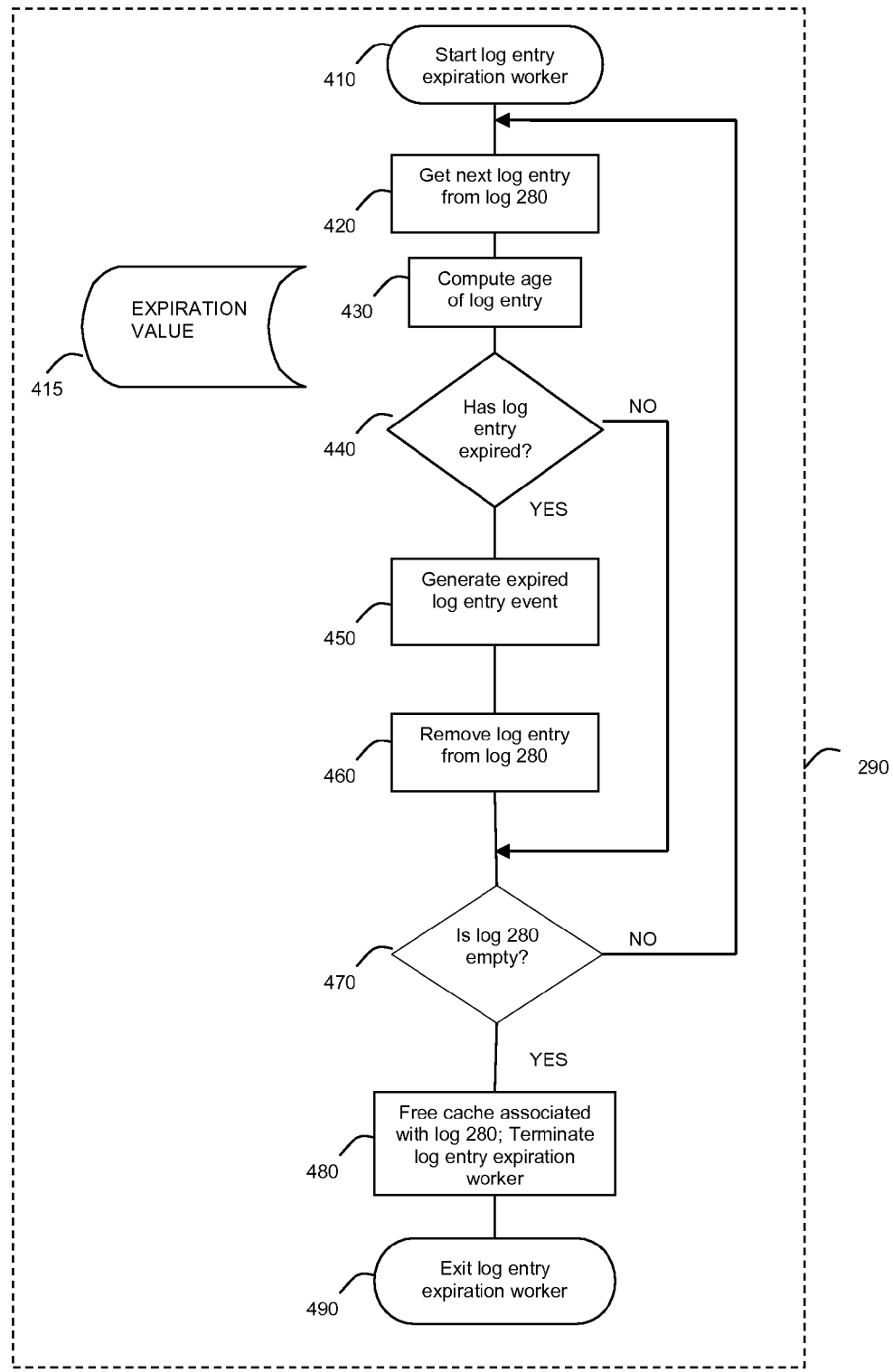
FIG. 4 illustrates a preferred embodiment of that portion of the present invention that comprises timing 290.

In a preferred embodiment, timing 290 is software executing in edge controller 120. Referring now to FIG. 4, timing 290 is described in more detail beginning with Start log entry expiration worker 410.

In block 420, timing 290 retrieves a log entry from log 280.

In block 430, timing 290 computes the age of the log entry by subtracting the timestamp portion of the log entry from the current contents of realtime clock 305.

In block 440, timing 290 determines if the log entry has expired by comparing the age computed in block 430 to an expiration value 415. Expiration value 415 can be established by default when timing 290 is initiated and expiration value 415 may be modified via configuration data passed in data stream commands_from_system 220. If the age is greater than expiration value 415, then operation proceeds to block 450. Otherwise, operation proceeds to block 470.

In block 450, timing 290 generates an event that notifies middleware 110 of the expired log entry. The notification, which is added to data stream data/notifications_to_system 210, comprises the tag ID and reader identifier associated with the expired log entry.

In block 460, timing 290 causes the expired log entry to be removed from log 280.

In block 470, timing 290 checks if any log entries remain in log 280. If log entries remain in log 280, operation proceeds to block 420. Otherwise operation proceeds to block 480.

In block 480, cache allocated for log 280 is freed and execution of timing 290 is stopped.

While the invention has been described with respect to a limited number of embodiments in the context of an edge controller, those skilled in the art, having benefit of this disclosure, will recognize that the present invention may appear in an RFID system anywhere between RFID transponders 140 and the backend system 100. Those skilled in the art will further appreciate that other embodiments can be devised which do not depart from the scope of the invention as disclosed herein. Accordingly, the scope of the invention should be limited only by the attached claims.

What is claimed is:

1. A method of identifying expired RFID data comprising:
   storing a log entry associated with reading an RFID transponder by an RFID reader, the stored log entry comprising a tag ID, a reader identifier corresponding to the RFID reader, and a timestamp corresponding to a time at which the log entry is created;
   monitoring the timestamp for each log entry with respect to an associated expiration value to determine whether the stored log entry has expired; and
   if the log entry has expired, initiating an event to notify other system elements of the tag ID and reader identifier associated with the log entry determined to be expired and freeing storage occupied by the log entry determined to be expired.

2. The method of claim 1, wherein the log entry is stored in a cache memory.

3. The method of claim 2, wherein monitoring the timestamp comprises:
   subtracting the timestamp from current time to provide a difference; and
   comparing the difference with a predetermined value.

4. The method of claim 3 wherein monitoring the timestamp is performed by a savant or worker task that is initiated when the first log entry is stored.

5. An apparatus for identifying expired RFID data comprising:
   storage for storing log entries associated with reading an RFID transponder by an RFID reader, the log entry comprising a tag ID, a reader identifier corresponding to the RFID reader, and a timestamp corresponding to a time at which the log entry is created;
   logic for monitoring the timestamp with respect to an associated expiration value to determine whether the stored log entry has expired; and
   logic for notifying other system elements of the tag ID and reader identifier associated with the log entry determined to be expired and for freeing storage occupied by the log entry determined to be expired.

6. The apparatus of claim 5 wherein the logic for monitoring the timestamp comprises:
   a realtime clock for ascertaining current time;
   logic for computing an elapsed time for each stored log entry, the elapsed time being the difference between the realtime clock and the timestamp; and
   logic for comparing the elapsed time for each stored log entry with a programmable expiration value.

7. The apparatus of claim 5 wherein the logic for monitoring the timestamp comprises a decrementing counter associated with each stored log entry, the counter being capable of being initialized with a programmable value at the time the log entry is stored, and that decrements in time and, upon reaching a predetermined value, indicates expiration of the associated log entry.

8. The apparatus of claim 5 wherein the logic for monitoring the timestamp comprises an incrementing counter associated with each stored log entry, the counter being capable of being initialized with a programmable value at the time the log entry is stored, and that increments in time and, upon reaching a predetermined value, indicates expiration of the associated log entry.

9. The apparatus of claim 5 wherein the logic for monitoring the timestamp comprises:
   a realtime clock used to ascertain current time; and logic for comparing the current contents of the realtime clock to the timestamp for each stored log entry.

10. A computer program product for identifying expired RFID data, the computer program product comprising a computer usable medium having computer usable program code tangibly embodied therewith, the computer usable medium comprising:

computer usable program code configured to store log entries associated with reading an RFID transponder by an RFID reader, the stored log entry comprising a tag ID, a reader identifier corresponding to the RFID reader, and a timestamp corresponding to a time at which the log entry is created;

computer usable program code configured to monitor the timestamp with respect to an associated expiration value to determine whether the stored log entry has expired; and computer usable program code configured to notify other system elements of the tag ID and reader identifier associated with an expired log entry, and to free storage occupied by a log entry determined to be expired.

11. The computer program product of claim 10, wherein the log entries are stored in a cache memory.

12. The computer program product of claim 11, wherein the computer usable program code configured to monitor the timestamp comprises:

computer usable program code configured to subtract the timestamp from current time to provide a difference; and computer usable program code configured to compare the difference with a predetermined value.

13. The computer program product of claim 12, wherein the computer usable program code configured to monitor the timestamp executes as a savant or worker task that is initiated when the first log entry is stored.

* * * * *